United States Patent [19]

Dwyer, III et al.

[11] Patent Number: 5,996,068
[45] Date of Patent: Nov. 30, 1999

[54] METHOD AND APPARATUS FOR RENAMING REGISTERS CORRESPONDING TO MULTIPLE THREAD IDENTIFICATIONS

[75] Inventors: Harry Dwyer, III, Township of Clinton, Hunterdon County; Hubert Rae McLellan, Summit, both of N.J.

[73] Assignee: Lucent Technologies Inc., Murray Hill, N.J.

[21] Appl. No.: 08/824,599

[22] Filed: Mar. 26, 1997

[51] Int. Cl.⁶ .................................................. G06F 13/00
[52] U.S. Cl. ........................................ 712/228; 712/217
[58] Field of Search .................................... 395/569, 393, 395/672, 392, 375; 364/206; 711/147, 202, 210; 712/217, 228

[56] References Cited

U.S. PATENT DOCUMENTS

| | | | |
|---|---|---|---|
| 4,992,938 | 2/1991 | Cocke et al. | 364/200 |
| 5,630,149 | 5/1997 | Bluhm | 395/393 |
| 5,671,383 | 9/1997 | Valentine | 395/392 |
| 5,694,564 | 12/1997 | Alsup et al. | 395/375 |
| 5,742,822 | 4/1998 | Motomura | 395/672 |
| 5,809,276 | 8/1998 | Deosaran et al. | 395/393 |

OTHER PUBLICATIONS

Waldspurger, Carl A. et al., Register Relocation: Flexible Contexts for Multithreading; International Symposium on Computer Architecture 20, 1993.

P.R. Nuth et al., A Mechanism for Efficient Context Switching; International Conference on Computer Design—91, 1991.

*Primary Examiner*—Eddie P. Chan
*Assistant Examiner*—Kimberly McLean

[57] ABSTRACT

A circuit and a scheme for register renaming responsive to a thread ID register, comprises: a plurality of physical registers; a plurality of architectual registers; a rename logic circuit where every write to an architectual register of the plurality of architectural registers is assigned a new physical register of the plurality of physical registers; a register map circuit containing a corresponding entry for each of the plurality of architectual registers. The register map circuit is responsive to the thread ID register such that a different physical map is selected for architectual registers of each thread, whereby the plurality of architectual registers can be greater than the plurality of physical registers.

14 Claims, 3 Drawing Sheets

METHOD AND APPARATUS FOR RENAMING REGISTERS CORRESPONDING TO MULTIPLE THREAD IDENTIFICATIONS

FIELD OF THE INVENTION

This invention relates to digital circuits, and more particularly to a scheme for optimizing the performance of such digital circuits.

BACKGROUND OF THE INVENTION

A register is a high speed temporary memory device used to receive, hold, and transfer data (usually a computer word) to be operated upon by a processing unit. Registers provide multiple operands and accept multiple results during each machine cycle. The number of registers defined by a particular architecture is limited by the access time and the amount of hardware that is required to support its high speed multi-port access. The number of registers is further constrained by the number of bits in each instruction that is dedicated for use as register specifiers. Current architectures with 32-bit instructions typically contain three to four 5-bit register specifiers and provide access to 32 registers.

The dynamic flow of instructions in a computer can be thought of as a thread of control. The thread "lives" within an address space that contains instructions and data. Historically, a process has only a single thread of control in each address space. However, to support parallelism, computers are beginning to support multithreading and allow simultaneous sharing of both instructions and data amongst different threads.

In multithreading, the cost of communication between threads as well as the overhead of creating, scheduling, and terminating threads are critical issues. One system, the Tera Multithreaded Architecture system (Tera MTA), a scalable, shared memory, general purpose parallel computer, developed by the Tera Computer Company of Seattle Washington, provides 128 thread contexts in each processor that share the same computation engine. Each thread context contains it's own set of 32 registers. The processor physically contains 4096 registers that are indexed by a combination of the register specifier and the identifier of the requesting thread. Creating a new thread involves allocating one of these register sets and starting a parallel (in time) execution at the beginning of the new thread.

Register renaming is a technique to allow multiple outstanding stores to the same register. This is useful in pipelined machines where different instructions have different execution latencies and can be completed out of order. With register renaming, data dependencies can be maintained by hardware and instructions can be issued more aggressively. There are typically 20–25% more physical registers than the architecture exposes to the user. The IBM Power1 has 38 physical registers and 32 architectural registers.

In an article entitled "Register Relocation: Flexible Contexts For Multithreading" by Carl Waldspurger at al., published in 1993 in International Symposium On Computer Architecture, a simple method of providing register renaming utilizing a Register Relocation Mask (RRM) is disclosed. Instruction operands specify context-relative register numbers. The context-relative register numbers are dynamically combined with the RRM to yield an absolute register number which is used in instruction execution. However, an RRM must be considered by the users as it is not transparent. Typically an RRM restricts the address base and limits the number of registers available to the user. The available number of registers further has a power of 2 size limitation and must be initialized when required.

Therefore, there is a need to transparently optimize register set access.

SUMMARY OF THE INVENTION

In accordance with the present invention, an apparatus and a scheme for register renaming responsive to a thread ID register, comprises: a plurality of physical registers; a plurality of architectural registers; a rename logic circuit where every write to an architectural register of the plurality of architectural registers is assigned a new physical register of the plurality of physical registers; a register map circuit containing a corresponding entry for each of the plurality of architectural registers. The register map circuit is responsive to the thread ID register such that a different physical map is selected for architectural registers of each thread, whereby the plurality of architectural registers can be greater than the plurality of physical registers.

DESCRIPTION OF THE DRAWINGS

The present invention is described in detail below in conjunction with the drawings, of which.

DETAILED DESCRIPTION OF VARIOUS ILLUSTRATIVE EMBODIMENTS

The rename pipeline stage is the logic that converts architectural register names, or those registers defined in the instruction set, to the internal physical register specifiers. Each register write is assigned a new physical register so memory hazards that were a consequence of a pipeline implementation such as write after write (WAW) and write after read (WAR) dependencies no longer occur. By renaming registers, all artificial data dependencies are eliminated. Only true data dependencies, such as read after write (RAW), remain. By eliminating the unnecessary data dependencies, instructions can be issued more aggressively and overall performance of the system is enhanced.

Another advantage gained with register renaming is the ability to overbook physical register assignment in a multithreaded architecture. Many instruction set threads consist of only a fairly short number of instructions and only access a limited subset of the full architectural register set before they terminate, while some threads access the entire register set. Therefore, the average number of registers required by each thread is less than the full architectural set of registers. By sharing a pool of physical registers for renaming the architectural registers of several threads, a smaller physical register file can appear to provide full register sets to multiple threads.

Figure 1:
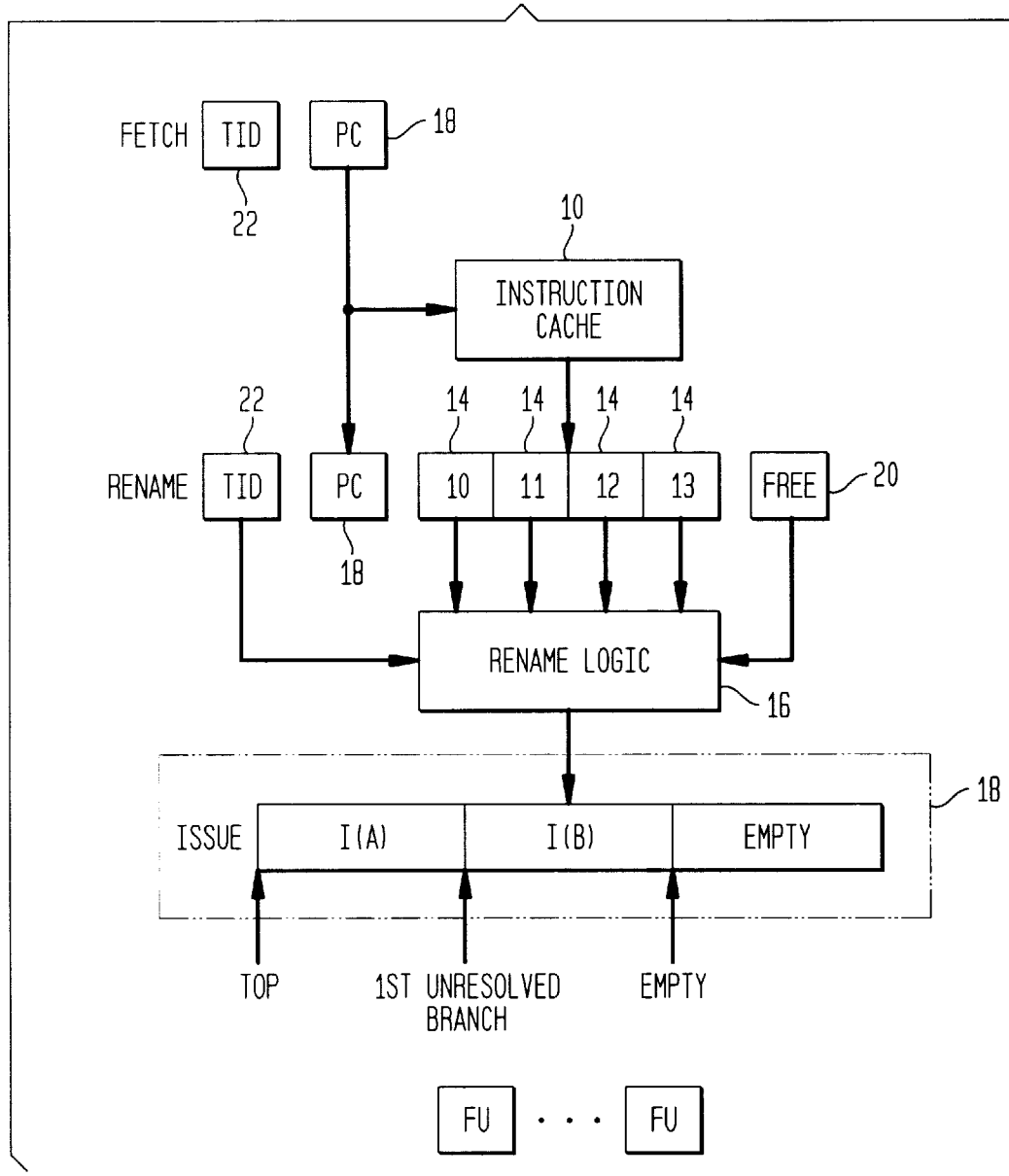
FIG. 1 shows rename logic in a typical pipeline.

Referring to FIG. 1 there is shown an exemplary embodiment of the rename logic in a typical pipeline. This embodiment describes a four way superscalar architecture. During each clock cycle in the normal sequential flow of instructions, the instruction cache 10 presents a four word cache line to the rename pipeline stage. The rename pipeline stage is the first opportunity in the pipeline for these instructions to be decoded. Prior to this stage, all information about these instructions must be inferred from their program counter (PC) 12 value. As the four instructions 14 are decoded, the rename logic 16 converts their architectural register names to physical register specifiers and passes them on to the issue stage 18. Free register 20 contains the name of the next physical register. The thread ID register (TID) 22 selects the register map to use for the instruction set stream.

The TID 22 which selects the register map, selects a different physical map for the architectural registers of each thread, wherein the single pool of shared physical registers are able to support the architectural registers of multiple threads. This enables the total number of architectural registers supported to be greater than the number of physical registers, resulting in the overbooking of the physical registers.

Figure 2:
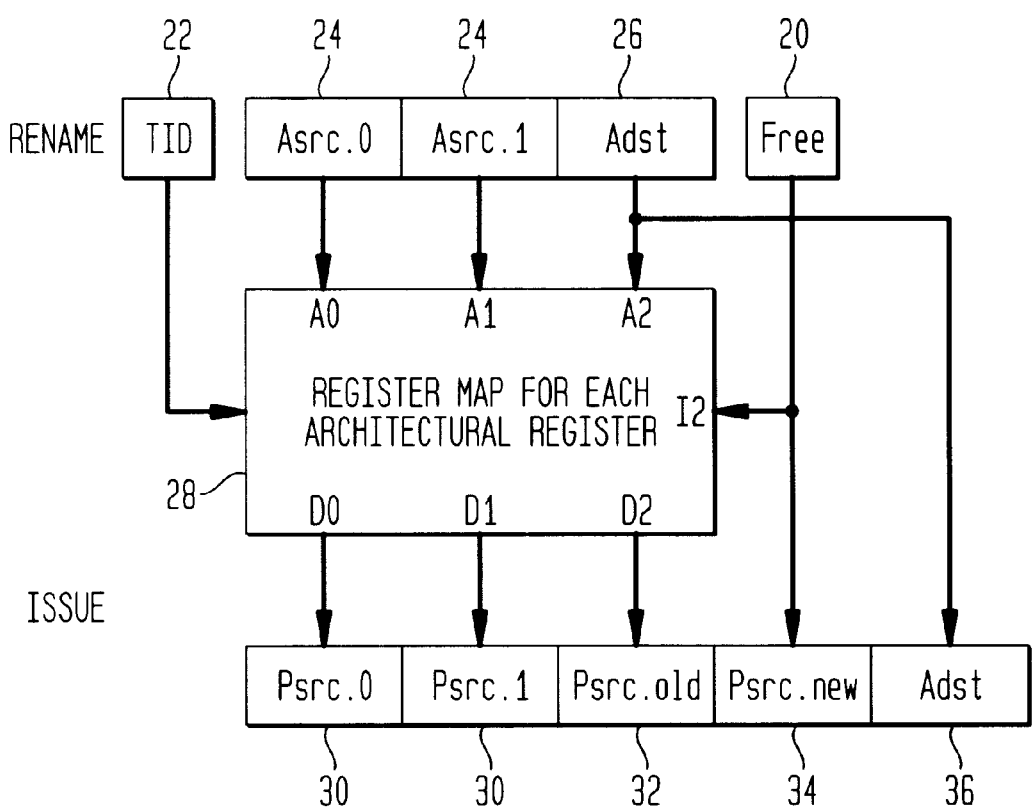
FIG. 2 shows a detailed diagram of register renaming for a single instruction set; and, FIG. 3 shows an exemplary embodiment of a 4-way instruction issue superscalar rename stage.

Referring to FIG. 2 there is shown a detailed diagram of register renaming for a single instruction set. Components which have a similar function to those shown in FIG. 1 have the same reference number assigned. The TID 22 selects the register map to use for the instruction stream. For clarity and simplicity, only the rename logic 16 for the first instruction (I0) 14 is shown. Except for the logic to handle RAW dependencies, which is described later, the renaming instruction's architectural registers are renamed in a similar manner. The first instruction has been expanded to show the fields relevant to register renaming, two architectural register sources (Asrc.0 and Ascr.1) 24 and a single architectural register destination (Adst) 26. These three 5-bit fields are sent to the register map addresses. The Free register 20 contains the name of the next physical register.

The register map 28 is a three port memory supporting three independent read operations, one of which also allows an optional write operation. The register map contains thirty two entries, one for each architectural register. Each entry is either invalid or contains the index of the physical register currently mapped to that architectural register. Physical registers are either mapped or free.

A valid bit is maintained for each physical register to indicate whether that register is mapped or free. A free physical register is not contained in any register map and has the valid bit cleared. A mapped physical register is named in at least one register map and has the valid bit set. Valid bits provide a convenient way to determine which physical registers are available for mapping and which physical registers are already mapped.

Initially, all architectural registers are unmapped. All register map entries are invalid and no physical registers are allocated. A new physical register is allocated for each architectural register destination renamed. As instructions pass through the rename stage, a new physical register is allocated by writing into the register map entry selected by the Adst 26 and the previous physical mapping of Adst (Pdst.old) 32 is read from the register map and sent to the issue stage. Because every write to an architectural register is assigned a new physical register, WAW and WAR data hazards are eliminated. Simultaneously, the architectural register sources, Asrc.0 and Asrc.1 24, are converted by the register map to previously mapped physical registers 30. When an instruction completes in the issue stage, its results are stored in the physical register selected by Pdst.new 34. The issue stage keeps track of Adst 36 and Pdst.old 32 for unmapping physical registers and restoring the previous register map. This is necessary for instructions that need to be flushed from the issue stage due to exceptions, interrupts, or mispredicted branches. It should be noted that the register map describes the state of the machine at the rename pipeline stage, not the stage of completed instructions. Any instructions that are renamed but not completed, must be unmapped before the register map is consistent with the executed state of the pipeline.

Figure 3:
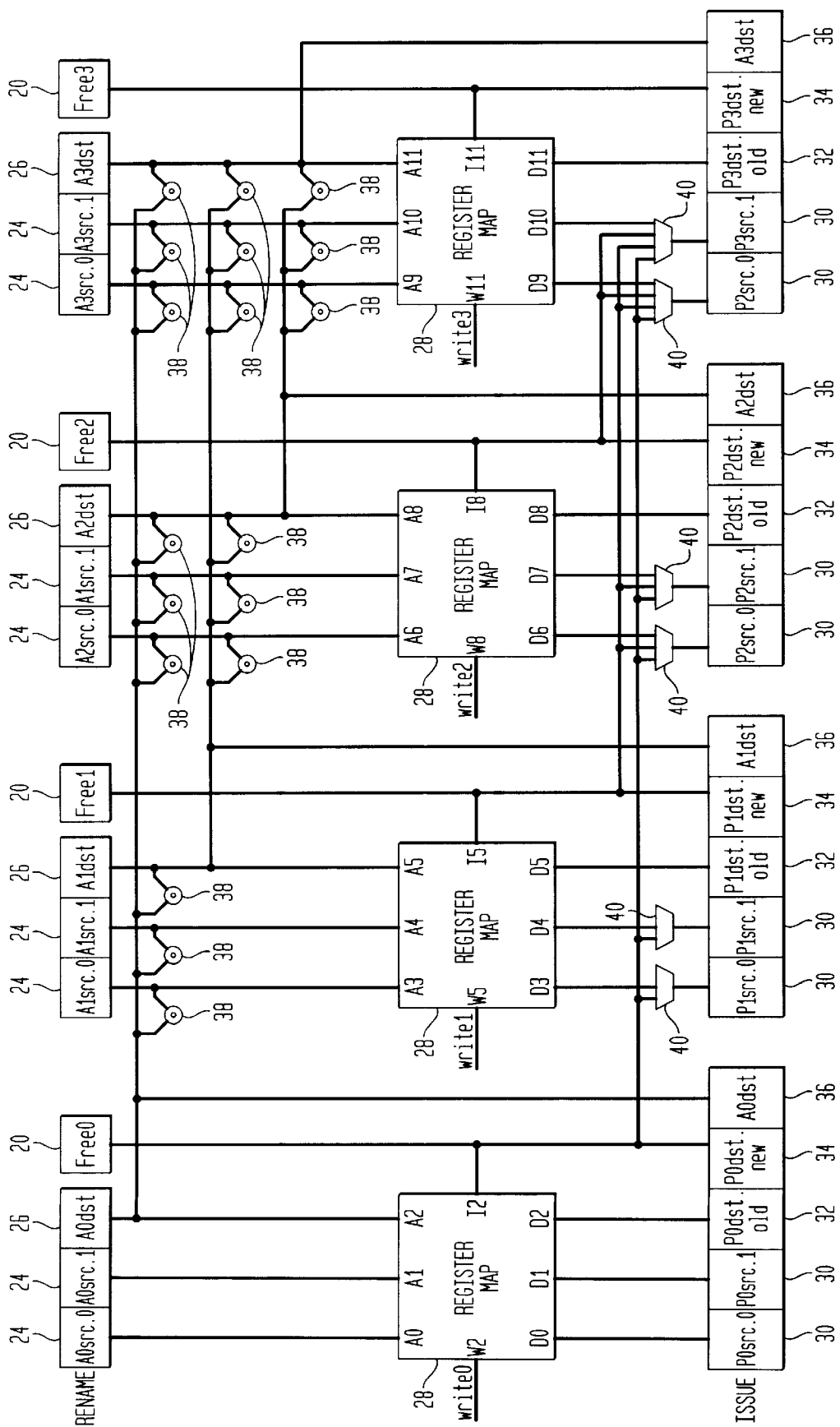

Referring to FIG. 3 there is shown an exemplary embodiment of a 4-way superscalar rename stage. Components which have a similar function to those shown in FIG. 2 have the same reference number assigned. The issue stage contains a queue of instructions that maintains the order of instruction execution. Instructions are inserted in the empty portion as space becomes available. Slots in the issue queue can be in one of the three states: empty, not-yet issued, and issued.

An N-way superscalar rename stage is slightly more complicated than the single issue renaming logic which is shown in FIG. 2 and described above. Instead of a three port register map, now there is a 3*N port register map. Instead of allocating a single new physical register each clock cycle, there are N new physical registers allocated. Since multiple instructions are being renamed simultaneously, any register dependencies within the group being renamed must be handled with extra map logic.

The extra map logic includes comparators 38 which compare the architectural register destination 26 (A0dst) of the first register remap circuit 28 with the two architectural register sources 24 (A1src.0 and A1scr.1) and the architectural register destination 26 (A1dst) of the second register remap circuit 28. Comparators 38, compare the architectural register destination 26 (A0dst) of the first register remap circuit 28 with the two architectural register sources 24 (A2src.0 and A2src.1) and the architectural register destination 26 (A2dst) of the third register remap circuit 28. Comparators 38, compare the architectural register destination 26 (A0dst) of the first register remap circuit 28 with the two architectural register sources 24 (A3scr.0 and A3src.1) and the architectural register destination 26 (A3dst) of the fourth register remap circuit 28. Comparators 38, compare the architectural register destination 26 (A1dst) of the second register remap circuit 28 with the two architectural register sources 24 (A2src.0 and A2scr.1) and the architectural register destination 26 (A2dst) of the third register remap circuit 28. Comparators 38, compare the architectural register destination 26 (A1dst) of the second register remap circuit 28 with the two architectural register sources 24 (A3src.0 and A3src1) and the architectural register destination 26 (A3dst) of the fourth register remap circuit 28. Comparators 38, compare the architectural register destination 26 (A2dst) of the third register remap circuit 28 with the two architectural register sources 24 (A3src.0 and A3src.1) and the architectural register destination 26 (A3dst) of the fourth register remap circuit 28.

Multiplexer 40 couples the Free register 20 (Free0) associated with the first register remap circuit 28 with the output of the second register remap circuit 28 (D3) to provide the previously mapped physical register 30 (P1src.0) associated with the second register remap circuit 28. Multiplexer 40 couples the Free register 20 (Free0) and the output of the second register remap circuit 28 (D4) to provide the previously mapped physical register 30 (P1src.1). Multiplexer 40 couples the Free register 20 (Free0) and Free register 20 (Free1) associated with the second register remap circuit 28 with the output of the third register remap circuit 28 (D6) to provide the previously mapped physical register 30 (P2src.0) associated with the third register remap circuit 28. Multiplexer 40 couples the Free registers 20 (Free0 and Free1) and the output of the third register remap circuit 28 (D7) to provide the previously mapped physical register 30 (P2src.1). Multiplexer 40 couples the Free registers 20

(Free0 and Free1) and Free register 20 (Free2) associated with the third register remap circuit 28 and the output of the fourth register remap circuit 28 (D9) to provide the previously mapped physical register 30 (P3src.0). Multiplexer 40 couples the Free registers 20 (Free0, Free1, and Free2) and the output of the fourth register remap circuit 28 (D10) to provide the previously mapped physical register 30 (P3src.1).

Register sources from down stream instructions that match an earlier instruction's register destination must reflect the new mapping instead of the now stale register map contents. Each instruction must compare it's architectural register sources with the architectural destination of previous instructions to detect RAW hazards.

If there is a RAW hazard, the register map is ignored and the physical source register is selected from the matching free register. If there are multiple matches, the latest instruction has priority. Comparators are required to prevent conflicting writes to the register map when multiple instructions write to the same architectural register. Only the last instruction to store in an architectural register is allocated a register map entry.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claim is reserved.

What is claimed:

1. A register renaming circuit responsive to a thread ID register, comprising:
   a plurality of physical registers shared between multiple threads;
   a plurality of architectural registers;
   a rename logic circuit where every write to an architectural register of said plurality of architectural registers is assigned a new physical register of said plurality of physical registers; and
   a register map circuit comprising a plurality of maps corresponding to different thread IDs, said plurality of maps containing a corresponding entry for each of said plurality of architectural registers, said register map circuit is responsive to the thread ID register such that a subset of said plurality of physical registers is mapped to architectural registers of each thread.

2. The circuit as recited in claim 1 wherein each of said plurality of physical registers has a free state and a mapped state.

3. The circuit as recited in claim 1 wherein said plurality of physical registers comprises a pool of physical registers wherein said physical registers being shared among said architectural registers.

4. The circuit as recited in claim 1 wherein said corresponding entry for each of said plurality of architectural registers is indicative of an invalid state or a valid state, said entry of said valid state containing an index of a physical register to which a corresponding architectural register is mapped.

5. The circuit as recited in claim 1 further comprising a register dependency comparator circuit for comparing architectural register destinations to prevent conflicting writes when multiple instructions write to a same architectural register, wherein only a last instruction to store in a particular architectural register is allocated a corresponding register map entry.

6. A register renaming circuit responsive to a thread ID register, comprising:
   a plurality of physical registers shared between multiple threads;
   a plurality of architectural registers;
   a rename logic circuit where every write to an architectural register of said plurality of architectural registers is assigned a new physical register of said plurality of physical registers;
   a register map circuit comprising a plurality of maps corresponding to different thread IDs, said plurality of maps containing a corresponding entry for each of said plurality of architectural registers, wherein said entry is indicative of an invalid state or a valid state, said entry of said valid state containing an index of a physical register to which a corresponding architectural register is mapped, said register map circuit is responsive to the thread ID register such that a subset of said plurality of physical registers is mapped to architectural registers of each thread.

7. The circuit as recited in claim 6 wherein each of said plurality of physical registers has a free state and a mapped state.

8. The circuit as recited in claim 6 wherein said plurality of physical registers comprises a pool of physical registers.

9. The circuit as recited in claim 6 further comprising a register dependency comparator circuit for comparing architectural register destinations to prevent conflicting writes when multiple instructions write to a same architectural register, wherein only a last instruction to store in a particular architectural register is allocated a corresponding register map entry.

10. A method of register renaming responsive to a thread ID register, comprising the steps of:
    assigning to an architectural register of a plurality of architectural registers on every write to said architectural register a new physical register from a plurality of physical registers shared between multiple threads;
    selecting a map corresponding to a thread ID from a register map circuit comprising a plurality of maps corresponding to different thread IDs
    mapping a subset of said plurality of physical registers to architectural registers of a thread corresponding to said selected map; and
    associating a corresponding entry for each of said plurality of architectural registers with a register map entry.

11. The method as recited in claim 10 further comprising the step of indexing said register map entry in a valid state to a physical register.

12. The method as recited in claim 10 wherein each of said plurality of physical registers is assigned either a free state or a mapped state.

13. The circuit as recited in claim 10 wherein said plurality of physical registers comprises a pool of physical registers.

14. The method as recited in claim 10 further comprising the step of comparing architectural register destinations to prevent conflicting writes when multiple instructions write to a same architectural register, wherein only a last instruction to store in a particular architectural register is allocated a particular register map entry.

* * * * *